United States Patent [19]

Desilets

[11] Patent Number: 5,363,409
[45] Date of Patent: Nov. 8, 1994

[54] METHOD AND SYSTEM FOR MULTIPLEXED DATA TRANSMISSION FROM HAZARDOUS ENVIRONMENTS

[75] Inventor: Robert J. Desilets, Bristol, R.I.

[73] Assignee: Scully Signal Company, Wilmington, Mass.

[21] Appl. No.: 818,638

[22] Filed: Jan. 6, 1992

[51] Int. Cl.⁵ .......................................... H04L 27/10
[52] U.S. Cl. ........................................ 375/45; 375/62
[58] Field of Search .............. 375/45, 48, 62, 113, 375/3, 9; 370/110.1; 455/17

[56] References Cited

U.S. PATENT DOCUMENTS

| | | | |
|---|---|---|---|
| 3,643,160 | 2/1972 | Roy et al. | 375/48 |
| 4,425,666 | 1/1984 | Groth, Jr. | 375/56 |
| 4,528,675 | 7/1985 | Esterling et al. | 375/45 |

FOREIGN PATENT DOCUMENTS 1012468  12/1965  United Kingdom ................ 375/48

Primary Examiner—Stephen Chin
Assistant Examiner—T. Ghebretinsae
Attorney, Agent, or Firm—Steinberg, Raskin & Davidson

[57] ABSTRACT

A three frequency system employs frequency shift keying (FSK) to transmit digital data from a plurality of non-stationary objects such as fuel trucks connectable to a plurality of transmit locations such as fuel pumps in a hazardous environment to a "safe area" computer. The three different frequencies are transmitted respectively as three pulses of different frequencies. Two of the three different pulse frequencies respectively represent a binary "one" and a binary "zero" whereas the third different frequency represents a "synchronization" or "start of message" signal which in a preferred embodiment causes the "safe area" computer receiving two consecutive pulses representative of the synchronization frequency from a particular transmit location as it cyclically interrogates the transmit locations to have an "interrupt" signal sent to its central processing unit (CPU) whereupon the central processing unit interrupts the task which it is performing to listen to at least one transmission of the entire two frequency binary "ones" and "zeros" message, the "safe area" computer having been programmed to recognize various sequential locations in the two frequency message as representative of such data as vehicle identification number, fleet identification number, type of fuel requested, etc.

13 Claims, 6 Drawing Sheets

METHOD AND SYSTEM FOR MULTIPLEXED DATA TRANSMISSION FROM HAZARDOUS ENVIRONMENTS

BACKGROUND OF THE INVENTION

The present invention relates to a method for multiplexed data transmission from such hazardous environments as fuel loading stations to a "safe area" computer, as well as means including hardware and software for practicing the method of the invention, Numerous problems have arisen in the transmission of data between a plurality of non-stationary objects in a hazardous environment to a safe area computer, As an example of a system in which such problems can arise, one can postulate a fuel loading station wherein trucks or other vehicles regularly come into physical contact with a plurality of fuel dispensers, and a master computer in a safe area remote from the hazardous environment of the fuel dispensers performs such functions as verifying from coded digital data that a particular vehicle in contact with one of the plurality of fuel loading dispensers is authorized to receive fuel, sending control signals to the particular dispenser to allow fuel to be pumped into the vehicle after verifying that the vehicle is an authorized one, and storing in memory such information as the type and amount of fuel and the time at which such fuel was pumped into the authorized vehicle.

One way in which the transmission of digital data and control information between non-stationary objects in a hazardous environment and a safe area computer has been accomplished in the past was a method comprising the coupling of an amplitude modulated signal between the respective non-stationary objects and the safe area computer via transformer action. However, a system using such a method has a high susceptibility to electrical interference and also suffers from the problem of degradation of the transmitted signal when long cable lengths are involved. These two factors of course negatively affect the integrity of any digital data received in the system. Also, such systems have the additional problem of extremely complex receiver circuits including the need for automatic gain control (AGC) circuit elements.

SUMMARY OF THE INVENTION

It is a primary object of the present invention to provide a system for transmitting digital data from a plurality of non-stationary objects such as fuel trucks connectable to a plurality of transmit locations such as fuel pumps in a hazardous environment to a "safe area" computer by means of a frequency shift keying (FSK) system.

It is another object of the present invention to implement the frequency shift keying method of transmitting digital data with a minimum of system "overhead" (hardware and software).

These and other objects of the present invention which will become apparent from the detailed description of the preferred embodiments are achieved by a frequency shift keying system which employs three frequencies. The three different frequencies are transmitted respectively as three pulses of different widths. Two of the three different pulse frequencies respectively represent a binary "ONE" and a binary "ZERO" whereas the third different frequency represents a "synchronization" signal which in a preferred embodiment causes a "safe area" computer receiving two consecutive pulses representative of the third "synchronization" frequency from a particular transmit location such as a dispenser pump as it cyclically interrogates the transmit locations to have an "interrupt" sent to its central processing unit whereupon the central processing unit interrupts the task which it is performing to "listen" to at least one transmission of the entire two frequency binary "ones" and "zeros" message. The "safe area" computer has been programmed to recognize various sequential locations in the two frequency messages as representative of such data as vehicle identification number, type of fuel requested, fleet identification number etc.

The method of the present invention for transmitting multiplexed data from hazardous locations such as fueling stations to a "safe area" computer comprises the steps of frequency shift keying three pulses of different respective widths representative of three distinct frequencies from a plurality of non-stationary objects respectively connected to a plurality of transmit locations to a safe area computer, a first of the three distinct frequencies being representative of a binary "one" in a data message, a second of the three distinct frequencies being representative of a binary "zero" in a data message, and a third of the three distinct frequencies being used as a "synchronization" frequency which in a preferred embodiment indicates that a data message composed of the aforementioned binary "ones" and "zeros" will follow immediately thereafter. The method of the present invention further comprises the "safe area" computer cyclically connecting and unconnecting itself for a predetermined interval to each transmit location in the hazardous area wherein it waits for reception of the third frequency, and only extends if necessary this predetermined interval to receive the complete data message comprising a series of binary "ones" and "zeros" if it receives a pulse representative of the third frequency within the predetermined interval. For security purposes, in a preferred embodiment of the invention, two consecutive pulses of the synchronization frequency are sent and must be received by the "safe area" computer before it takes the previously discussed action.

The Applicant is unaware of any frequency shift keying systems which employ two frequencies respectively representative of binary "ones" and "zeros" for multiplexed data transmission from a plurality of transmit locations in a hazardous environment to a "safe area" computer. However, even if such a two frequency FSK system were contemplated for use for the multiplexed data transmission of the present invention, such a two frequency FSK system would inherently present more difficulties and require considerably more hardware and software than the three frequency FSK systems of the present invention. More specifically, in such a two state system, when the receiver ("safe area" computer) multiplexes to a new channel thereby connecting itself to a new transmit location (fuel dispenser) in the hazardous environment, the "safe area" receiver computer must read the incoming data continuously while searching for some type of synchronization word, or special hardware must be designed to recognize the synchronization word. On the other hand, the use of a third frequency or "state" as heretofore described in connection with the system of the present invention requires that the central processing unit (CPU) of the "safe area" computer need only devote itself to the digital data being transmitted to it from the particular transmit location to which it is connected when the computer has received the "synchronization" or "start of message" third frequency, and has responded thereto by sending an "interrupt" signal to the CPU. In the absence of this "interrupt" signal, the CPU is free is tend to other tasks which may be considered to be of more importance and which may be totally unrelated to the digital data transmission from the hazardous environment.

BRIEF DESCRIPTION OF THE DRAWINGS

A more complete appreciation of the invention and many of the advantages thereof can be readily understood by reference to the following detailed description when considered in connection with the accompanying drawings in which.

DESCRIPTION OF THE PREFERRED EMBODIMENTS

Figure 1:
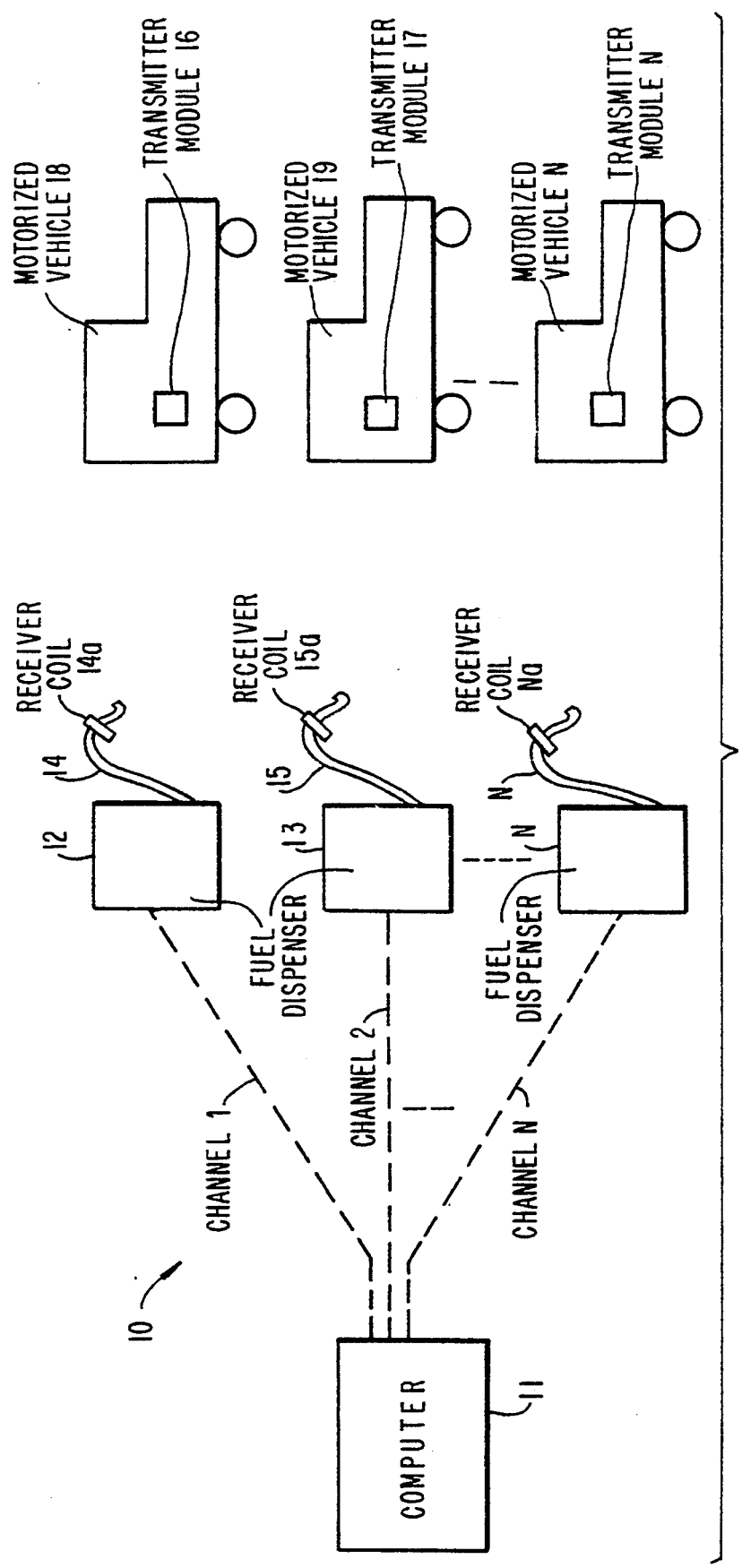
FIG. 1 is a schematic drawing of a system in accordance with the invention illustrating the main components thereof.

Referring now to the drawings wherein like reference characters designate identical or corresponding elements throughout the various Figures, and more particularly with reference to FIG. 1, the multiplexed digital data transmission system of the present invention, generally designated with reference numeral 10, comprises a "safe area" computer 11 capable of receiving digital data transmitted from a plurality of fuel dispensers 12, 13, ... and over respective channels 1, 2, ... N. Each of the fuel dispensers (12, 13, ... N) comprises a dispensing hose (14, 15 ... N) and each hose has its own respective receiver coil (14a, 15a, ... Na).

The aforementioned channels are shown in the Figures as each comprising two wires, but the use of other channels such as telephone lines is contemplated within the scope of the invention. Also, the concept of transmitting data from a plurality of hazardous locations to a single, remotely located, "safe area" computer is contemplated within the scope of the invention.

Figure 2:
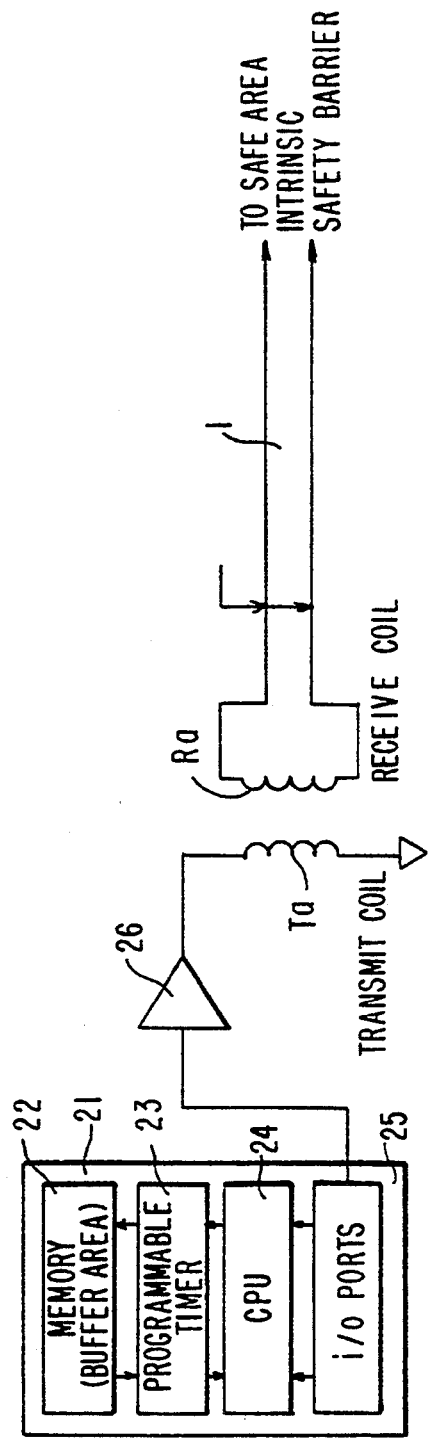
FIG. 2 is a schematic drawing of a preferred embodiment of a transmit circuit which can be used in the system of FIG. 1.

The digital data transmitted over the various channels to the "safe area" computer 11 is delivered to an inductive coil generally designated Ra (FIG. 2) by respective transmitter modules 16, 17 ... N respectively located on a plurality of motorized vehicles 18, 19, ... N (FIG. 1). As shown in FIG. 2, each of the transmitter modules comprises a microcontroller 21 having therein a buffer area memory 22, a programmable timer 23, a central processing unit (CPU) 24, and a plurality of input/output ports 25, all of the aforementioned elements of microcontroller 21 being interconnected so as to facilitate transmission of the digital data generated therein through amplifier 26 and a transmit coil generally designated Ta, the respective transmit coils Ta being permanently connected to the respective fuel dispensers (12, 13, ... N) so as to be in close proximity to the respective receiver coils (14a, 15a ... Na) so as to allow transformer action to occur, whereby the digital data is inductively transmitted to the receive coil Ra of the respective fuel dispenser to which the motorized vehicle is connected.

As will be readily apparent from the transmitter block diagram of FIG. 2, such functions as the movement of data through shift registers in the buffer area memory of microcontroller 21 and the timing generation within the microcontroller would normally be implemented in software, although they could of course be also implemented in hardware.

Figure 3:
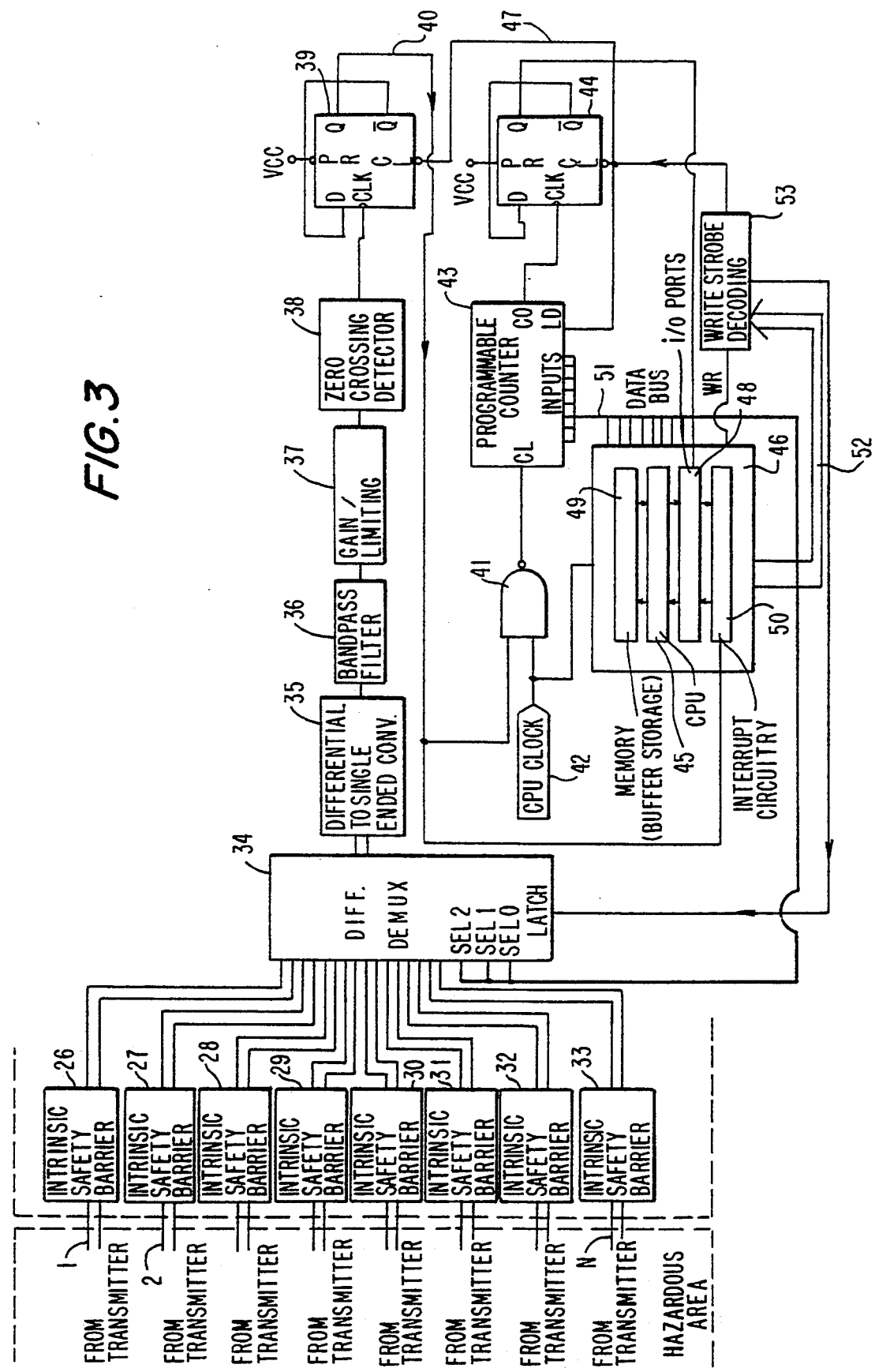
FIG. 3 is a schematic drawing of a preferred embodiment of a receiver circuit which can be used in the system of FIG. 1.

As shown in FIG. 3, digital data transmissions from channels 11, 12 ... N pass through respective intrinsic safety barriers 26–33 and thereupon are conveyed to differential dimultiplexer 34. Differential demultiplexer 34 maintains the various differential signals which have been coupled from respective inductors 20 (FIG. 2) through the intrinsic safety barriers 26–33 which convey the differential signals to the "safe area" computer. Electrical interference is thus considerably reduced since all common mode signals cancel at the differential to single ended converter 35. Thereupon the output signal from differential to single ended converter 35 is passed through bandpass filter 36 which uses the center of the three frequency shift keying transmit frequencies as its midband. Bandpass filter 36 contributes further to the reduction of interference and/or noise in the receiver since any interference or noise which is not within the frequency band of interest will be therein filtered out.

After leaving bandpass filter 36, the signal is passed through a gain/limiter stage module 37 such that wide variations in signal amplitude can be accommodated. After the gain limiting function performed upon it by module 37, the signal passes through zero crossing detector 38 which in turn clocks D-type flip-flop circuit 39 which is configured in the toggle or self-latching mode. The Q output of flip-flop 39 is transmitted over line 40 to one of the inputs of the clock gating NAND gate 41. The CPU clock signal 42 is applied to the other input of NAND gate 41 to gate the clock input of a programmable counter 43 during the time that the output of flip-flop 39 is high. The carry out (CO) signal from the programmable counter 43 is latched by another D-type flip-flop 44 so that the CPU 45 within the microcontroller 46 of the "safe area" computer 11 can determine if the counter 43 has rolled over during the count cycle. In this manner the time interval of each period can be determined by the CPU 45 as explained in more detail with reference to the flow chart of FIG. 6.

The falling edge of the clock gate signal from flip-flop 39 also generates, along line 40 and through one of the input/output ports 48 of microcontroller 46, an "interrupt" to CPU 45 to inform the CPU that a full cycle of the input has been counted. When the CPU 45 makes use of buffer memory 49 and interrupt circuitry 50 within microcontroller 46 to respond to the aforementioned "interrupt", it tests the output of the carry out latching terminal (CO) of programmable counter 43 to determine if the period of the input signal is great enough to cause counter 43 to "roll over" (count past its programmed threshold value).

Other circuit elements of FIG. 3 include the data bus 51 through which signals are interchanged among the various circuit elements of microcontroller 46.

Also as shown in FIG. 3, the differential demultiplexer 34 has a plurality of digital word selection inputs sel 2, sel 1, and sel 0 connected to the data bus 51, and the write strobe decoding unit 53 operates to receive "write" input "WR" from CPU 45, and thereupon sends a signal to differential demultiplexer 34 to "latch in" a particular digital word. The write strobe decoding unit also has another output connected to the clear (CL) terminal of flip-flop 44. This signal also simultaneously loads the counter with the threshold value and clears flip flop 39 via line 47.

The write strobe decoder generates write pulses for whatever device is addressed via the address bus.

Figure 4:
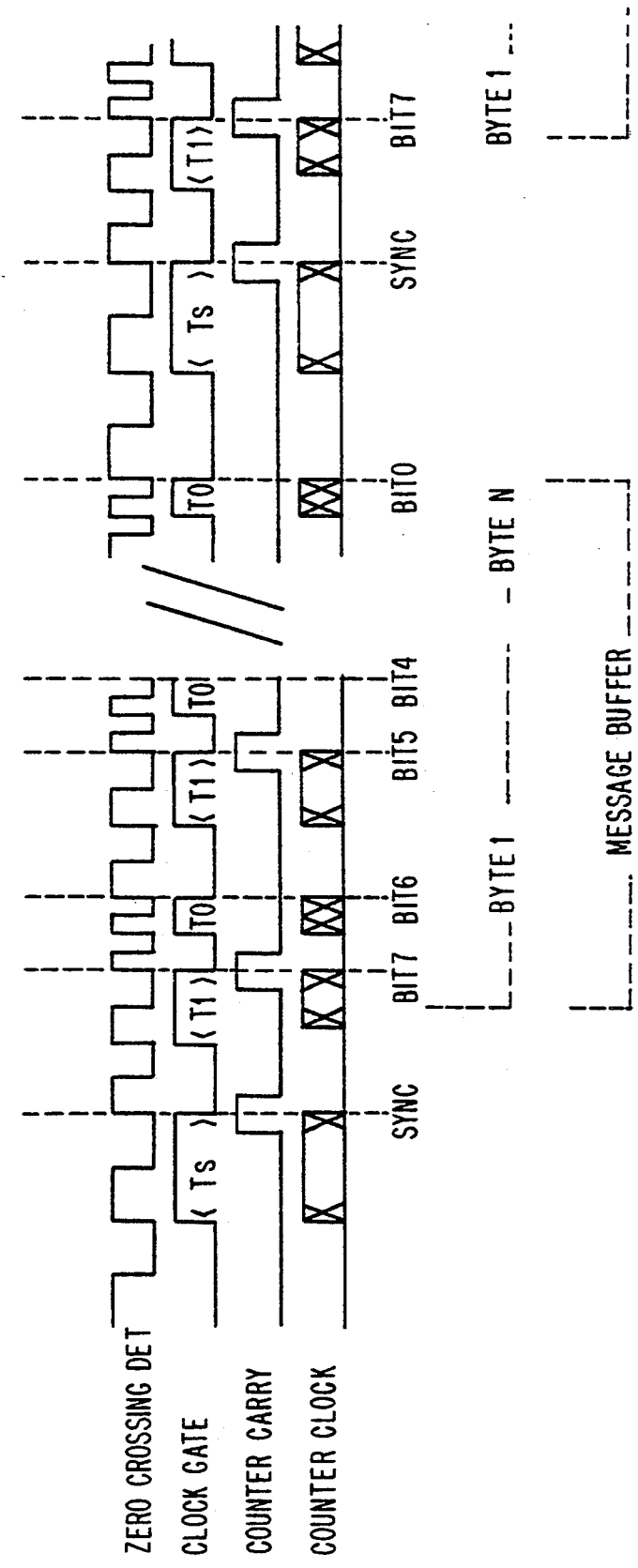
FIG. 4 is a graph showing the relative timing of various signals generated in the receiver circuit of FIG. 3.

As can be seen from the various signals shown in FIG. 4 which should be evaluated in the context of the receiver circuit of FIG. 3, the FSK system of the present invention comprises the use of a synchronization frequency Ts, a binary "one" frequency T1, and a binary "zero" frequency T0. As the "clock gate" signal of FIG. 4 shows, the three different frequencies have different pulse widths and consequently the periods of the pulses representative of these three different respective frequencies are different. Also, as has already been explained with reference to FIG. 3, reception of a synchronization frequency pulse Ts generates an "interrupt" which is conveyed to CPU 45 of the "safe area" computer, whereupon the computer acts to have its CPU 45 "listen" to the message buffer which, as shown in FIG. 4, comprises a series of pulses representative of binary "ONES" and "ZEROS" with said message having a length in bytes, and with each byte comprising eight bits. As has been stated previously, computer 11 has been preprogrammed to recognize the sequential position of various bits within the message as being representative of certain data parameters such as the type of fuel desired by one of the motorized vehicles connected to one of the fuel pumps (FIG. 1), the fleet identification number, and the vehicle identification number.

The three frequency FSK system of the present invention is far superior to any two frequency FSK system which might be contemplated for use in the multiplex data transmission system of the present invention for two very important reasons. First, as stated previously, in a two state FSK system, when the receiver computer multiplexes to a new channel, it must read the incoming data on that channel continuously while searching for some type of synchronization word composed of binary "ones" and "zeros" or special hardware must be designed to recognize the synchronization word. Moreover, since such a synchronization word must necessarily be transmitted in the binary "ones" and "zeros" which are the only frequencies available in the two frequency FSK system, and since the receiver computer can multiplex to the new channel at any time during message transmission from a motorized vehicle connected to a transmitting fuel pump, considerable "overhead" comprising hardware and/or software is needed just to recognize the synchronization word which is transmitted in the same binary "ONES" and "ZEROS" as the data being transmitted from the motorized vehicle.

The second important advantage of a three frequency FSK system over a two frequency FSK system relates to security. More specifically, since the synchronization word of the two frequency system is transmitted in the same binary "ones" and "zeros" as the data being transmitted, and since the receiver computer can multiplex to the transmitting channel at any point in the message, and since electrical noise and/or interference could easily result in a binary "one" being mistakenly received as a binary "zero" or vice-versa, the possibility exists for some part of the synchronization word being misinterpreted as being data transmission or some part of the data transmission being misinterpreted as the synchronization word. Obviously, considerable additional "overhead" in the form of hardware and/or software must be added to the system to avoid this potentially disastrous situation.

Figure 5:
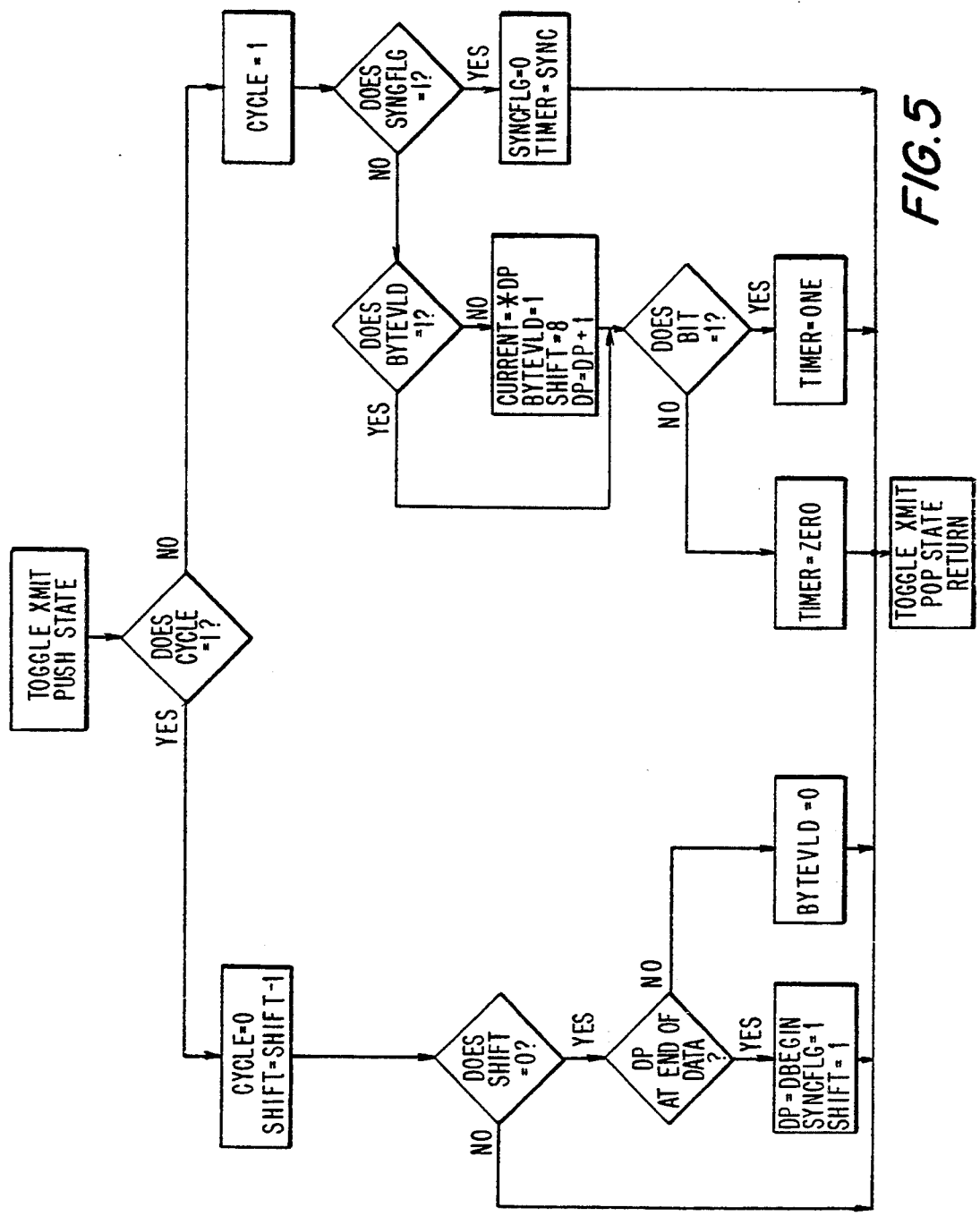
FIG. 5 is a flow chart which illustrates how software programmed into some of the hardware components of FIG. 2 functions to transmit the "interrupt" signal in accordance with the system of the present invention.
Figure 6:
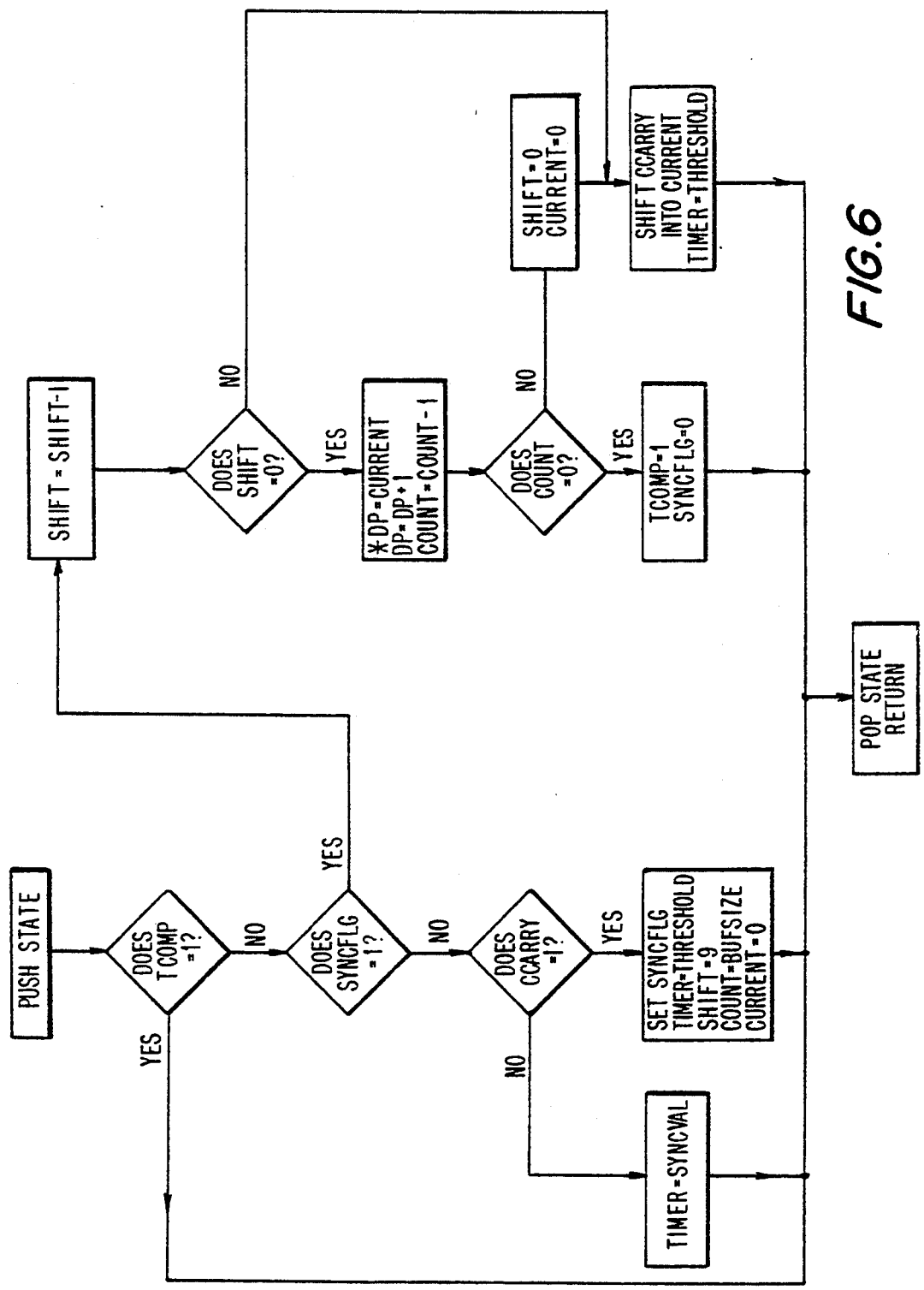
FIG. 6 is a flow chart which illustrates how software programmed into some of the hardware components of the receiver circuitry of FIG. 3 functions to properly convey the aforementioned "interrupt" signal to the central processing unit (CPU) of the "safe area" computer of the present invention.

FIGS. 5 and 6 respectively are flow charts of transmit and receiver algorithms which can be used with the system of the present invention. In both flow charts, fixed length message buffers are assumed, although this is not absolutely necessary. Each message buffer will be followed by some type of checksum value for validation. It is also assumed in these flow charts that the data from the object in the hazardous environment is being transmitted continuously.

It is submitted that the flow chart of FIG. 5 is by itself readily comprehensible to one skilled in the art, in view of the legend therein. However the following information, which should be taken in the context of FIGS. 1 and 2, is given to facilitate the practicing of the invention by one skilled in the art.

With regard to the transmit algorithm of the present system whose flow chart is shown in FIG. 5, the digital data that is to be transmitted from a motorized vehicle such as 16 in FIG. 1 by means of a fuel dispenser such as dispenser 12 in FIG. 1 is placed into a memory buffer area such as element 22 of the microcontroller 21 of FIG. 2. In this manner, an "interrupt" routine can be used to continually transmit the data in this area. It is assumed that the aforementioned checksum value is computed and placed into the transmit memory area as part of the output buffer.

Prior to transmitting the first word of the message buffer, a timing generator such as programmable timer 23 of the microcontroller 21 is instructed to generate two cycles of the aforementioned synchronization frequency. Once the synchronization signal has been sent, the first word of the digital data transmit message buffer is written into a shift register in the buffer area 22. Each bit of the word is shifted into the timing generator 23 and a bit signal of the proper frequency (binary "one" or binary "zero") is transmitted to the transmit coil 27 through amplifier 26. After each word is transmitted from transmit coil 27 to the receive coil 20 (FIG. 2), a buffer pointer is checked to see if the end of the message buffer has been reached. If such is the case the buffer pointer is set to the beginning of the buffer message and the process repeats itself. However, if there is an indication that the end of the message buffer has not yet been reached, the next word is written into the shift register and the buffer point is incremented. With regard to the receive algorithm whose flow chart is shown in FIG. 6, FIG. 3 indicates that several transmitters can be simultaneously accommodated by one receiver. When the "safe area" computer switches to a new transmitter, a value "SYNCVAL" is loaded into the programmable counter 43 (FIG. 3) that will generate a carry out signal (FIG. 4) only when the period of the synchronization frequency Ts is sensed by the computer. The main program of the computer 11 also clears a transmission complete flag (TCOMP) 20 as an indicator to the interrupt routine that it is to proceed with decoding the input.

As shown in FIG. 3, the receiver computer input signal is converted to a single ended signal in differential to single ended converter 35, passed through band pass filter 36, sent through a gain/limiter stage module 37, and finally passed through a zero crossing detector 38 which clocks D-type flip-flop 39 in the toggle mode such that a square wave equal to one half the frequency of the input signal is present at one input of the clock gating NAND gate 41. The CPU clock 42 gates on the programmable counter through the aforementioned NAND gate 41 for one cycle of the input so that it can incrementally count up from its preloaded value. When one full cycle is measured, an interrupt to the CPU 45 is generated. The CPU 45 of the "safe area" computer 11 can then check as to whether a carry out has occurred via the carry out latch flip-flop 44. If this bit is set, then the synchronization state has been sensed. Otherwise, the CPU 45 needs only to reload the counter 43 with the synchronization measurement interval and can return from its "interrupt" status to normal operation. On the other hand, if the synchronization state has been detected, the CPU 45 loads the counter 43 with a new value (threshhold) such that a binary "one" frequency will cause a carry out and a binary "zero" frequency will not cause a carry out. The CPU 45 can then again return from its "interrupt" status. At each "interrupt" interval therafter, the value of the carry out latch is read and used as the receiver bit value. When the entire message value is read into the receiver computer 11, the transmission complete flag (TCOMP) is set to "1" by the interrupt routine such that the main program is instructed to process the input buffer. Subsequently, the main program can switch the receiver computer to "listen" to a new channel and the process repeats itself.

Details of the present invention may easily vary within the scope of the inventive concepts set forth above, which have been presented by way of example only. Therefore, the preceding description of the present invention is merely exemplary, and is not intended to limit the scope thereof in any way.

What is claimed is:

1. A system for transmitting digital data from a hazardous location to a "safe area" computer, said system comprising:

a plurality of digital data transmitting means located within said hazardous location;

a plurality of digital data generating means, each of said digital data generating means connectable to any one of said plurality of digital data transmitting means;

a computer located within a "safe area" remotely situated from said hazardous location;

means for carrying a frequency shift keyed signal generated by one of said digital data generating means and comprising pulses of three different frequencies from each of said digital data transmitting means to said computer, a first of said three different frequencies being indicative of a "synchronization" state, a second of said three different frequencies being indicative of a binary "one" bit and a third of said three different frequencies being indicative of a binary "zero", and wherein said system comprises a plurality of fuel loading pump, said plurality of digital data transmitting means each comprise an electronic circuit situated proximate to a respective one of said fuel loading pumps, and said system comprises a plurality of motorized vehicles, and said digital data generating means each comprises a digital data generating circuit mounted on one of said plurality of motorized vehicles, said motorized vehicles each being connected to one of said fuel loading pumps and each said digital data generating circuit being electrically connectable to each said electronic circuit, said digital data generating means further comprising a microcontroller, said microcontroller comprising a central processing unit (CPU), buffer area memory circuitry connected to said CPU, programmable timing circuit connected to said CPU, and a plurality of input/output ports, and said digital data generating means comprises an amplifier connected to an output of said microcontroller, and an induction coil connected to an output of said amplifier.

2. The system of claim 1, wherein said electronic circuit comprises an induction coil connectable by electromagnetic induction to said induction coil connected to an output of said amplifier.

3. The system of claim 1, further comprising barrier means separating said hazardous location from said "safe area".

4. The system of claim 3, wherein said means for carrying said frequency shift keying signal comprise a plurality of channels, and said barrier means comprises a plurality of safety barriers situated such that each of said channels passes through a respective safety barrier in its path from said digital data transmitting means to said computer.

5. The system of claim 1, wherein said means for carrying said frequency shift keying signal comprise a plurality of channels, each of said channels connecting a respective one of said digital data transmitting means and said computer.

6. The system of claim 1, wherein said computer comprises means therein for sequentially connecting itself through said carrying means to said transmitting means, and a central processing unit, said computer detecting said first "synchronization" frequency and sending an "interrupt" signal to said central processing unit, said central processing unit being arranged to receive at least one full transmission of a digital data message composed of said second and third frequencies respectively representative of said binary "ones" and binary "zeros" upon receiving said "interrupt" signal, and said computer being arranged to recognize the sequential location of at least some of the binary "ones" or "zeros" in said digital data message as being representative of at least part of the information being sent with respect to a particular data parameter.

7. A system for transmitting digital data from a hazardous location to a "safe area" computer, said system comprising:

a plurality of digital data transmitting means located within said hazardous location;

a plurality of digital data generating means, each of said digital data generating means connectable to any one of said plurality of digital data transmitting means;

a computer located within a "safe area" remotely situated from said hazardous location, said computer comprising a differential demultiplexer for receiving a respective plurality of signals from said plurality of digital data transmitting means, a differential to single ended converter connected to an output of said differential demultiplexer and functioning to cancel out common mode differential signals therein, a bandpass filter connected to an output of said differential to single ended converter a gain/limiter circuit connected to an output of said bandpass filter, a signal "zero crossing" detector connected to an output of said gain/limiter circuit, a first flip-flop circuit configured in the toggle mode and having a clock input therein which is connected to an output of said zero crossing detector, a clock gating NAND gate having one input connected to an output of said first flip-flop circuit, a central processing unit (CPU) generating a CPU clock signal which is conveyed to another input of said NAND gate, a programmable counter having an input whereby it is incremented by an output from said NAND gate, a second flip-flop circuit functioning to latch a carry out signal from said programmable counter such that said central processing unit can determine whether said counter has counted past its threshold value during its count cycle; and means for carrying a frequency shift keyed signal generated by one of said digital data generating means and comprising pulses of three different frequencies from each of said digital data transmitting means to said computer a first of said three different frequencies being indicative of a "synchronization" state, a second of said three different frequencies being indicative of a binary "one" bit and a third of said three different frequencies being indicative of a binary "zero".

8. The system of claim 7, further comprising said differential demultiplexer having a plurality of digital word selection inputs, said system further comprising a data bus connected to said central processing unit and to said programmable counter, and said system further comprising a write strobe decoding unit connected to receive an input from said central processing unit through said data bus and on the basis of said input to send a signal to a latching input of said differential demultiplexer such that one of said word selection inputs is thereby latched in, and said write strobe decoding unit having another output connected to a clear input terminal of said second flip-flop circuit.

9. The system of claim 7, wherein said digital data generating means further comprise a microcontroller, an amplifier connected to an output of said microcontroller, and an induction coil connected to an output of said amplifier, said microcontroller comprising a central processing unit (CPU), buffer area memory circuitry connected to said CPU, programmable timing circuitry connected to said CPU of said microcontroller, and a plurality of input/output ports.

10. The system of claim 9, wherein said plurality of digital data transmitting means each comprise an electronic circuit having an induction coil connectable by electromagnetic induction to said induction coil connected to an output of said amplifier.

11. The system of claim 7, further comprising barrier means separating said hazardous location from said "safe area".

12. The system of claim 11, wherein said means for carrying said frequency shift keying signal comprise a plurality of channels, and said barrier means comprises a plurality of safety barriers situated such that each of said channels passes through a respective safety barrier in its path from said digital data transmitting means to said computer.

13. The system of claim 7, wherein said means for carrying said frequency shift keying signal comprise a plurality of channels, each of said channels connecting a respective one of said digital data transmitting means and said computer.

* * * * *